Aug. 20, 1940.   C. L. HARMON   2,212,419
APPARATUS FOR BATCH WEIGHING
Filed Nov. 9, 1938   2 Sheets-Sheet 2

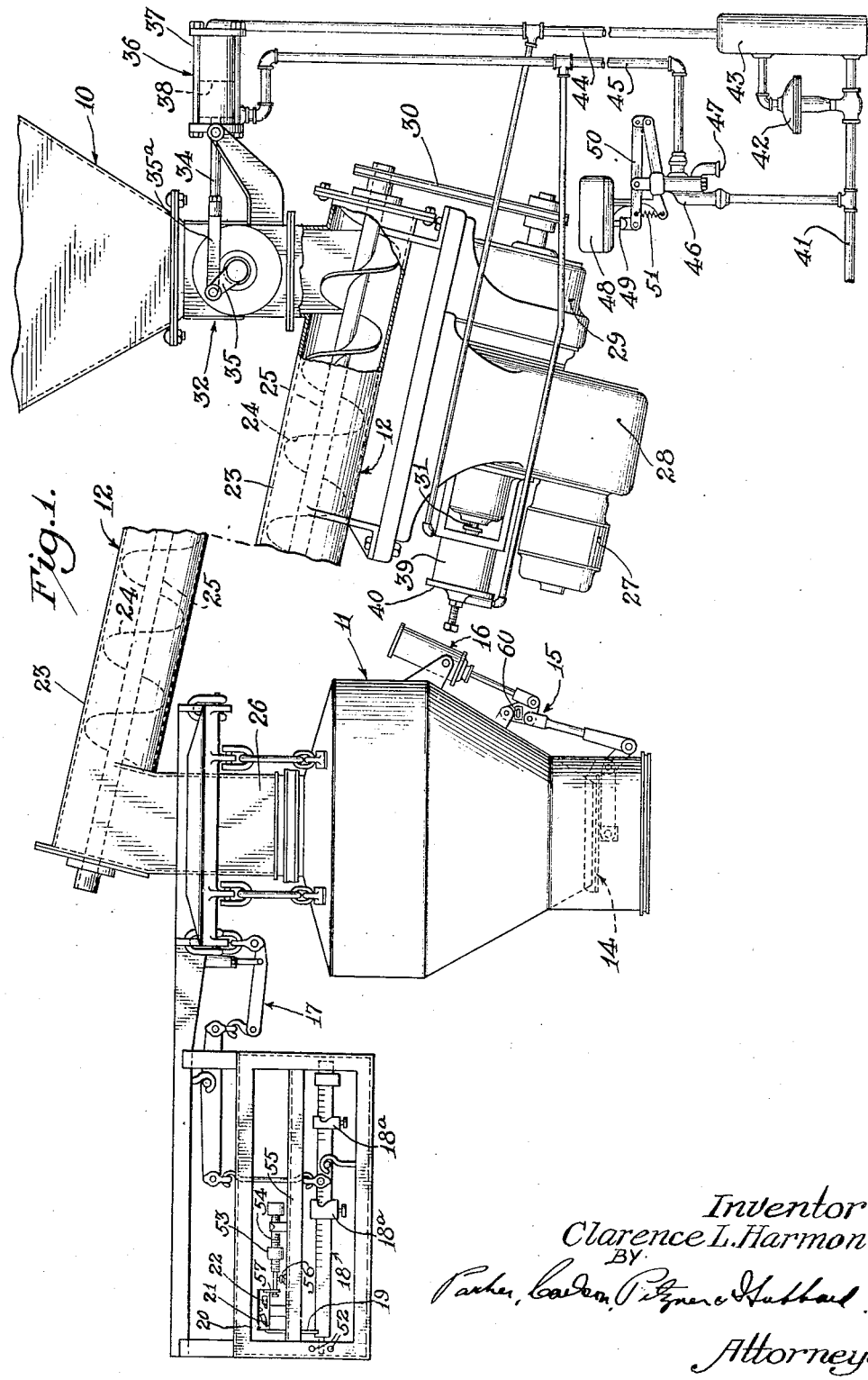

Inventor
Clarence L. Harmon
BY
Attorneys.

Patented Aug. 20, 1940

2,212,419

UNITED STATES PATENT OFFICE 2,212,419

APPARATUS FOR BATCH WEIGHING

Clarence L. Harmon, Austin, Tex., assignor to The C. S. Johnson Company, Champaign, Ill., a corporation of Illinois Application November 9, 1938, Serial No. 239,641

3 Claims. (Cl. 249—2)

The invention relates to a weigh batcher for automatically weighing out pre-selected quantities of such materials as dry cement, sand, gravel, crushed rock and the like. Materials of this character are hereinafter referred to by the generic term "bulk materials." Weigh batchers for the general purpose described have been heretofore used, one successful prior type being disclosed in Charles S. Johnson Patent No. 2,008,305, issued July 16, 1935. This Johnson patent takes cognizance of the fact that bulk materials vary greatly in their gravitational flow characteristics, due in a large measure to the effects of aeration, packing or arching of the material in the supply bin in which they are stored. Such variations in flow characteristics cause trouble in weigh batching when the material is fed by gravity directly into the batcher since a sudden rush or so-called "wild blow" of material at a time when the batch is almost complete is likely to cause an inadvertent overrun. For further particulars as to the problem reference may be had to said Johnson patent, particularly, page 1, lines 6 to 24 and page 2, lines 14 to 44. In the particular apparatus shown in said Johnson patent the gravitational flow of materials into the weigh hopper of the batcher is controlled through the medium of a pair of feelers interposed in the stream of material and which serve to detect undesirable variations in flow.

The general object of the present invention is to provide an improved and simplified apparatus for accomplishing batch weighing, and in which any effects of packing and arching of the bulk material in the supply bin are positively prevented from affecting the accuracy of the weighing operation.

Another object of the invention is to provide an apparatus for the batch weighing of bulk materials in which the material is fed into the weighing container or the like substantially continuously until a major portion of the batch is accumulated and then the rate or velocity of feed materially reduced during the completion of the batch so as to aid in preventing overrun.

Still another object of the invention is to provide an apparatus of the type set forth in which bulk materials are fed to a weighing container in a generally continuous stream with fresh material substantially continuously added to the stream by gravity flow from a storage bin or the like, until a major portion of the selected batch is accumulated, and then the batch completed by continuing the stream movement but without adding any further fresh material to the stream.

It should be understood that the term "stream" is used herein in its broad sense as comprehending material moving with a continued succession of parts whether or not the successive parts or bunches of material are actually in contact or are on the other hand carried, for example, in successive buckets on a belt conveyor.

Further objects and advantages of the invention will become apparent as the following description proceeds, taken in connection with the accompanying drawings, in which:

Figure 1 is a front elevational view, partly in section, of a weighing batcher embodying the invention.

Figure 3:
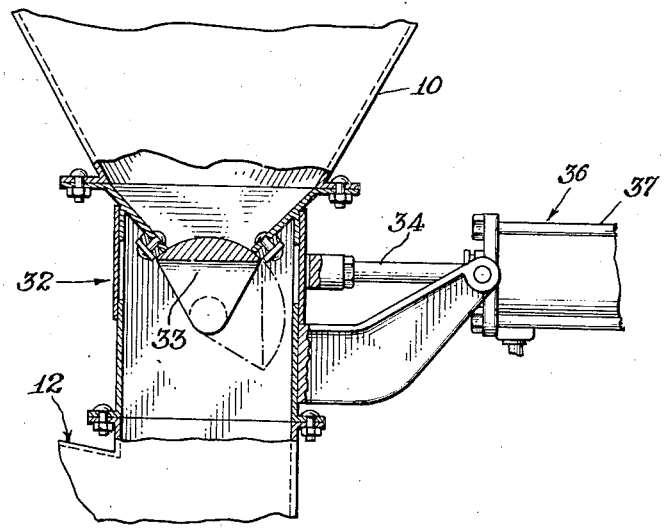
Fig. 3 is a vertical sectional view of the storage bin discharge valve.

In utilizing the particular apparatus illustrated, bulk materials, such as dry cement, from a storage bin 10 (Fig. 1) are accumulated in batches of pre-selected total weight in a weigh hopper or weighing container 11. To describe this operation in a few words: The material is fed into the top of the hopper 11 in a substantially continuously moving ascending or uphill stream as, for example, by means of a power driven screw conveyor 12. Fresh material is continuously supplied to the ascending stream by a gravity flow from the supply bin 10 until the material accumulated in the hopper 11 constitutes a predetermined major portion of the selected total batch. At such time the supply of fresh material to the ascending stream is automatically cut off and the batch completed from the material already in the stream. It is also desirable to reduce the speed of movement of the stream, and its rate of movement in terms of quantity per unit time, automatically after the major portion of the batch has been completed. By employing such a procedure an inadvertent overrun or over-filling of the weigh hopper 11 is obviated. This latter result is possible since the material is fed into the weigh hopper entirely by power movement and along an uphill or counter-gravitational path so that there cannot be any inadvertent gravitational feed of material from the stream into the hopper. Furthermore, since the minor or final feed into the hopper is accomplished at a reduced rate the possibility of overrun due to an accumulation of material between the end of the conveyor 12 and the top of the hopper 11 is minimized. In other words, when a stream of large volume is flowing into the hopper the increment of material in the stream between the upper end of the conveyor and the top of the pile in the hopper is of substantial weight. Consequently, if the conveyor feed is stopped, in response to accumulation of the full batch weight in the hopper, when such a stream is flowing, the increment of material noted will thereafter fall by gravity into the hopper and add its substantial weight to the batch, thereby rendering the measuring operation inaccurate. By using a low rate minor or final feed, the weight of material in the portion of the stream between the conveyor mouth and the pile in the hopper is minimized and the addition to the batch is negligible. When a batch of selected weight has been finally accumulated in the weigh hopper 11 the feed movement of the conveyor 12 is automatically terminated. The batch may then be dumped from the hopper 11 into a truck, a cement mixer, or any other desired container or conveyor.

Turning now to a more detailed consideration of the particular apparatus illustrated it will be seen, upon reference to Fig. 1, that the weigh hopper 11 constitutes a closed and generally cylindrical container tapering to an outlet in the bottom end thereof which is normally closed by a closure member or discharge valve 14. The weigh hopper 11 and weighing mechanism may be of substantially the same form as that disclosed in said Johnson Patent No. 2,008,305 and have been so illustrated. Accordingly a detailed description is believed to be unnecessary. To identify the parts in general, it will be noted that the closure member 14 is arranged to be swung downwardly into open position and reclosed through the medium of a toggle mechanism 15, which is in turn actuated by a fluid operated motor 16. The fluid operated motor 16 is provided with a suitable control (not shown) such that the weigh hopper 11 may be dumped at will. The weigh hopper itself is carried by the lever system of a beam scale 17. Beam 18 of the scale is connected (Fig. 2) by a link 19 with a tiltable carrier 20, on which are disposed two control switches 21 and 22 arranged to accomplish automatic control of the associated apparatus as will hereinafter appear.

In order to feed bulk materials from the bin 10 into the weigh hopper 11 in an ascending or uphill stream a conveyor 12 is provided. This conveyor has been shown as being of the conventional rotational screw type and includes a generally cylindrical casing 23 in which a spiral screw 24 is carried by a shaft 25 journaled in the ends of the casing. The upper end of the casing communicates with a vertical cylindrical casing 26, the lower end of which surrounds a filling opening in the otherwise closed top of the weigh hopper 11. At the opposite or lower end of the conveyor casing 23 an inlet opening is provided which registers with a discharge opening at the bottom of the storage bin 10. It will be appreciated that other types of conveyors may be utilized although it is desirable that the conveyor be enclosed to prevent loss of such loose and powdery materials as dry cement. A screw conveyor is preferred since it feeds the material in an altogether uninterrupted stream and also tends to smooth out inequalities in the rate of flow of material through it.

The screw conveyor 12 is driven by a power pack supported on a bracket beneath the conveyor and including an electric driving motor 27. In order that the completion of the filling of the weigh hopper 11 may be accomplished at a reduced rate and velocity of feed a multi-speed drive is preferably provided for the conveyor 12. This multi-speed drive may be any one of a number of such drives of conventional form. It has been shown herein as embodying a single speed electric motor 27, and change-speed gearing 28, coupled through a speed reduction gearing 29 and a drive chain 30 with the conveyor shaft 25. The change-speed gearing 28 is actuated by an axially shiftable shaft 31. When the latter is shifted to the right (as viewed in Fig. 1) the change-speed gearing 28 is shifted to its "high" speed position and conversely when the shaft 31 is shifted to the left, to the position shown, the change-speed gearing is in its "low" speed position. The use of such a change-speed gearing makes it possible to utilize a low cost form of single speed motor although, of course, a multi-speed driving motor, without change-speed gearing, may be used if desired.

In order to control the gravitational flow of material from the storage bin 10 into the inlet end of the conveyor 12 a discharge valve 32 is provided. This valve embodies (Fig. 3) a segmental shaped valve element 33 which is pivoted for oscillation from its closed position, shown in full lines in Fig. 3, to its open position, shown in dotted lines. Shifting of this valve element is accomplished by the reciprocation of an actuator plunger 34 connected to the valve element 33 by a crank 35 and pitman 35ᵃ (Fig. 1). When the valve 32 is open, material is free to flow by gravity from the storage bin into the conveyor and, of course, when the valve is closed all such supply of material to the conveyor is effectively stopped.

Actuation of the change-speed gearing 28 and storage bin discharge valve 32 is accomplished through the medium of a pressure fluid actuator system. It will be understood by those skilled in the art, however, that any other suitable type of actuator system may be used if desired. In the particular construction illustrated (Figs. 1 and 3) the discharge valve 32 is actuated by a pressure fluid motor 36 embodying a cylinder 37 and a piston 38 reciprocable therein and attached to the actuator plunger 34. Similarly, the change-speed gearing actuator-shaft 31 is connected to a reciprocable piston within cylinder 39 of a pressure fluid actuator or motor 40.

Pressure fluid, such, for example, as compressed air, is supplied to the system through a high pressure supply line 41. A portion of this high pressure fluid passes through a pressure reducing valve 42 and receiver 43 to a supply line 44 through which it is supplied to the respective motor cylinders 37 and 39 so that the pistons therein are consequently urged in a direction to close the valve 32 and shift the change-speed gearing 28 to its "low" speed position. High pressure fluid is supplied to the opposite ends of the actuator cylinders 37 and 39 through a supply line 45 under the control of a three-way valve 46. When this valve is in the position shown in Fig. 1, the supply of pressure fluid to the conduit 45 is cut off and the latter is open directly to atmosphere at 47 so as to permit the lower pressure fluid in the conduit 44 to shift the actuators 36 and 40 in such manner as to close the valve 32 and shift the change-speed gearing 28 to its "low" speed position. When the valve 46 is shifted to its other position, the exhaust to atmosphere at 47 is cut off and high pressure fluid is supplied to the conduit 45 directly from the supply line 41, so that the valve 32 is opened and the change-speed gearing 28 is shifted to its "high" speed position.

An electrically energizable solenoid 48, having a vertically movable armature 49 connected with the valve 46 through a link 50 serves to shift the valve to its pressure supplying position and a tension spring 51 returns the valve to its exhaust position, upon deenergization of the solenoid. In general, when the solenoid 48 is energized the bin discharge valve 32 is opened and the change-speed gearing 28 is shifted to its "high" speed position, and conversely, when the solenoid 48 is deenergized the valve 32 is closed and the change-speed gearing is shifted to its "low" speed position.

Figure 2:
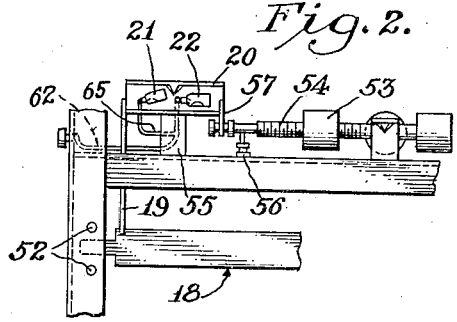
Fig. 2 is an enlarged elevational view of a portion of the switch mechanism.

Automatic control of the feed of material into the weigh hopper 11 so as to obtain the accumulation of batches of material of predetermined weight in the hopper is effected, in the illustrative apparatus, by the use of the tiltably mounted switches 21 and 22 (Fig. 2). These switches are of the enclosed mercury type and are arranged to be opened successively in the upward movement of the scale beam 18. The link 19 connecting the scale beam 18 with the carrier 20 serves to shift the carrier in accordance with the movement of the scale beam. The switch 21 is so mounted that it is opened when the beam 18 is centered between its stops 52, that is, when the desired weight of material has been fed to the hopper 11, and it is desirable that the switch 22 be open when a slightly less weight has been reached. The point at which the switch 22 opens may be varied by means of an adjustable counter weight 53 carried by a pivoted beam 54 mounted on the frame 55. One end of the beam 54 is positioned beneath the carrier 20 and tends to move downwardly toward a stop 56 so as to act through a link 57 in a manner to pivot the carrier 20 in a direction to raise the scale beam 18. The link 57 is so formed that it provides for lost motion between the link and the cooperating end of the beam 54 after the latter beam has come to rest upon the adjustable abutment 56, whereby to permit free movement of the scale beam 18 and the associated switch carrier 20.

Figure 4:
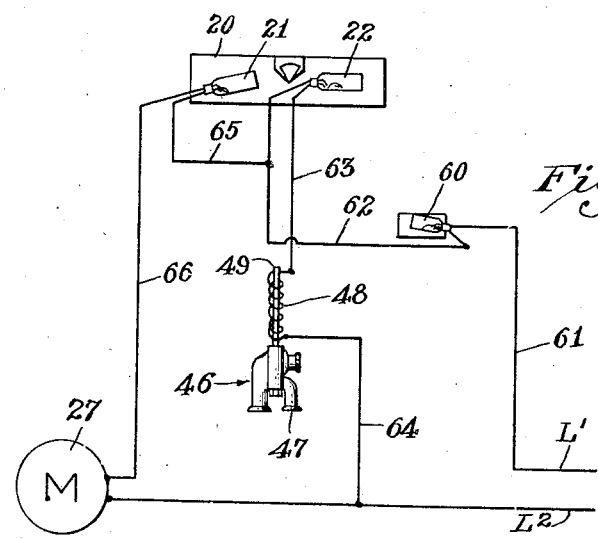
Fig. 4 is a wiring diagram of the control circuit.

In order to initiate operation of the batcher the hopper discharge gate or valve 14 is closed, thereby closing a totally enclosed type mercury switch 60 (Fig. 1) mounted on the toggle mechanism 15. Since the switches 21 and 22 are already closed when the hopper 11 is empty, closure of the switch 60 serves to energize the valve operating solenoid 48 from suitable electric supply lines L₁—L₂, as shown in Fig. 4 (through a circuit 61—60—62—22—63—48—64—L₂). Closure of the switch 60 also connects the conveyor driving motor 27 to the supply lines L₁—L₂ (through a circuit

L₁—61—60—62—65—21—66—27—L₂)

Energization of the valve actuating solenoid 48 causes the bin discharge valve 32 to be fully opened and the change-speed gear 28 to be shifted to its "high" speed position in the manner previously described. Consequently, material falls freely from the storage bin 10 through the gate or valve 32 into the conveyor 12 and is moved by the latter in a substantially continuous ascending stream to the top of the casing 26 through which it falls into the weigh hopper 11.

This charging of material into the weight hopper 11 continues at a rapid or fast feed rate until a major portion of the predetermined batch is accumulated in the hopper. During the filling operation the scale beam 18 is progressively tilted so that finally when the major portion of the batch is completed the switch 22 is opened, thereby deenergizing the solenoid 48.

Deenergization of the solenoid 48 at the completion of a major portion of the batch, permits the three way control valve 46 to shift to its exhaust position so that the bin discharge valve 32 is closed and the change-speed gearing 28 shifted to its "low" speed position. Consequently, no fresh material is supplied to the stream in the conveyor 12 and the screw 24 of the conveyor continues to turn, although at a substantially reduced speed. The volumetric capacity of the conveyor 12 is so chosen that the material in it will be ample to complete the batch during the final or minor feed. By reducing the speed of revolution of the conveyor screw 24 two results are accomplished. First, the rate of movement of the material in the conveyor stream in terms of weight per unit time is reduced and, second, the velocity of the material is reduced. Both of these are factors in preventing overrun of the batch, that is, overfilling of the weigh hopper 11 beyond the predetermined weight selected. Since the rate of flow of material in the stream is reduced there will be only a small amount of material in the casing 26 between the end of the conveyor screw and the top of the pile of material in the weigh hopper. Therefore, when the screw is stopped, in response to the accumulation of a predetermined weight of material in the weigh hopper at the final completion of the batch, the addition due to the amount of material in the casing 26 will be substantially negligible. Second, since the velocity of the material passing through the conveyor 12 is low there will be little or no overshooting due to the momentum of the material. Of course, the construction of the screw conveyor itself prevents any such overshooting of material except from the last half convolution of the screw, in so far as the overshooting may be due to the momentum of the material as distinguished from the momentum of the screw. In view of the fact that the material is moved by the conveyor 12 in an ascending or uphill stream there can be no gravitational flow of material into the hopper at or near the completion of the batch no matter how irregularly the material may flow from a storage bin 10. The closure of the bin discharge valve 32 during the minor feed further insures against any inadvertent overfilling of the hopper due to a last moment rush of material from the bin, commonly known as a "wild blow."

At the completion of the batch the scale beam 18 tilts still further to a point midway between the stops 52 so that the second control switch 21 is opened and the conveyor driving motor 27 thereby open-circuited and stopped. In view of the foregoing it will be seen that the feed of material into the weigh hopper 11 is effectively and completely cut off at the instant the weight of material in the hopper reaches a predetermined value so that the weigh batching operation is accomplished entirely automatically and with a high degree of precision. The proportion of the minor feed to the major feed can be varied by shifting the relative angular positions of the control switches 21 and 22. Similarly, the overall weight for the selected batch may be varied by shifting counterweights 18ᵃ on the beam 18 (Fig. 1).

After the complete batch has been accumulated in the weigh hopper 11, it may be discharged into any chute, container, conveyor or the like simply by opening the discharge gate 14. The opening of the gate also serves to open the switch 60 so that as the switches 21 and 22 are reclosed during the discharge of the material from the weigh hopper there will not be any inadvertent restarting of the conveyor drive. After the hopper 11 has been emptied the weighing cycle may again be initiated, as described above, simply by reclosing the discharge gate 14.

Although a particular application and embodiment of the invention have been described and shown in some detail, there is no intention to thereby limit the invention to such application and embodiment, but, on the other hand, I intend to cover all modifications and alternative constructions falling within the spirit and scope of the invention as expressed in the appended claims—

I claim as my invention:

1. In a weighing apparatus for bulk materials the combination of, a weigh hopper, power actuated means for feeding material into said hopper, means for feeding material to said power actuated means, means responsive to the weight of the material in the hopper for positively shutting off all further feeding of material from said last named means to said power actuated means upon the accumulation of a predetermined fractional portion of a batch of predetermined weight in said hopper, and means responsive to the weight of material in the hopper for stopping said power actuated means upon the accumulation of the complete predetermined batch in said hopper.

2. A weigh batcher for loose bulk materials comprising, in combination, a storage bin having an outlet at a low point therein, valve means for controlling the gravitational flow of all material from said bin, a weigh hopper, power actuated conveyor means for receiving material from said valve means and moving the same from the valve into said hopper, control means for closing said valve in response to the accumulation in said hopper of a predetermined major although fractional portion of a preselected batch of material to thereby positively arrest all further addition of material to that previously supplied to said conveyor means, and further control means for stopping said conveyor means in response to a completion of said preselected batch.

3. In a weighing apparatus for bulk materials the combination of, a weigh hopper, power actuated means for feeding material into said hopper, means for feeding material to said power actuated means responsive to the weight of the material in the hopper for positively shutting off all further feed of material from said last named means to said power actuated means and for diminishing the rate of operation of said power actuated means upon the accumulation of a predetermined fractional portion of a batch of predetermined weight in said hopper, and means responsive to the weight of material in the hopper for finally stopping said power actuated means upon the accumulation of the complete predetermined batch in said hopper.

CLARENCE L. HARMON.